United States Patent
Kulesza et al.

(10) Patent No.: US 7,636,741 B2
(45) Date of Patent: Dec. 22, 2009

(54) ONLINE PAGE RESTORE FROM A DATABASE MIRROR

(75) Inventors: Jakub Kulesza, Bellevue, WA (US);
Rajeev B. Rajan, Kirkland, WA (US);
Steven R. Schmidt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 11/204,593

(22) Filed: Aug. 15, 2005

(65) Prior Publication Data

US 2007/0038682 A1    Feb. 15, 2007

(51) Int. Cl.
*G06F 17/30* (2006.01)
(52) U.S. Cl. .............................. 707/202; 707/8; 707/10
(58) Field of Classification Search ................ 707/202, 707/204, 200, 201, 8, 10, 203; 711/161, 711/162
See application file for complete search history.

(56) References Cited

U.S. PATENT DOCUMENTS

| | | | |
|---|---|---|---|
| 5,307,481 A | 4/1994 | Shimazaki et al. | 395/575 |
| 5,966,706 A * | 10/1999 | Biliris et al. | 707/10 |
| 6,205,449 B1 | 3/2001 | Rastogi et al. | 707/202 |
| 6,772,309 B1 * | 8/2004 | Ohr et al. | 711/163 |
| 6,799,189 B2 | 9/2004 | Huxoll | 707/204 |
| 6,877,016 B1 | 4/2005 | Hart et al. | 707/201 |
| 6,883,112 B2 | 4/2005 | Maeda et al. | 714/6 |
| 7,177,993 B1 * | 2/2007 | Kiselev et al. | 711/162 |
| 7,254,683 B2 * | 8/2007 | Burton et al. | 711/162 |
| 2003/0097533 A1 | 5/2003 | Maeda et al. | 711/162 |
| 2004/0002975 A1 * | 1/2004 | Scardo et al. | 707/8 |
| 2004/0030721 A1 | 2/2004 | Kruger et al. | 707/104.1 |
| 2004/0098425 A1 | 5/2004 | Wiss et al. | 707/204 |
| 2004/0215998 A1 * | 10/2004 | Buxton et al. | 714/2 |

(Continued)

FOREIGN PATENT DOCUMENTS

GB    2 273 180    6/1994

(Continued)

OTHER PUBLICATIONS

Brown, Eric., "An Overview of SQL Server 2005 Beta 2 for the Database Administrator", *Microsoft® Tech Net, Microsoft SQL Server TechCenter*, Jul. 17, 2004, http://www.microsoft.com/technet/prodtechnol/sql/2005/maintain/sqlydba.mspx, 14 pages.

(Continued)

*Primary Examiner*—Hosain T Alam
*Assistant Examiner*—Amy Ng
(74) *Attorney, Agent, or Firm*—Woodcock Washburn LLP

(57) ABSTRACT

A set of servers takes advantage of the existing data redundancy of a mirrored database to restore page corruptions. The page restore may occur with none of the time and/or administration costs of a restore from backup media and without the data loss associated with repair. Online page restore from a database mirror can be initiated and performed by the computer system automatically upon corruption detection. An entire file or database instead of an individual page or set(s) of pages can be restored. The mechanism can be used both to restore corrupt pages on the principal server from a mirror, or corrupt pages on a mirror from the principal server. Online page restore from a database mirror enables page data recovery without the need to find/load/scan through and apply data and log backups, allowing efficient and potentially automatic data recovery.

18 Claims, 5 Drawing Sheets

U.S. PATENT DOCUMENTS

2005/0055559 A1* 3/2005 Bucher .................... 713/188
2005/0071391 A1   3/2005 Fuerderer et al. .......... 707/204
2007/0174583 A1* 7/2007 Shinkai et al. ............. 711/203

OTHER PUBLICATIONS

Talmage, Ron., "Split-Mirror Backup and Restore", SQL Server Magazine, *Microsoft® Tech Net, Microsoft SQL Server TechCenter*, Updated May 31, 2002, http://www.microsoft.com/technet/prodtechnol/sql/2005/maintain/spltmirr.mspx, 6 pages.

Remote Data Backup-Online Backup Plan for Automatic Internet Backup. A Web Backup., http://www.remotedatabackups.com, Aug. 13, 2005, 2 pages.

* cited by examiner

ONLINE PAGE RESTORE FROM A DATABASE MIRROR

BACKGROUND

Data stored on computers is lost or damaged every day. Accidents, human error, virus attacks, hardware failures and power problems are just some of the thousands of possible reasons for loss or damage of information stored on a computer. To protect against the unexpected loss of data, smart people (and businesses) commonly backup their files. A backup can be made by simply making a copy of a file or set of files on some kind of removable medium for use in the event of failure or loss of the original, or the data can be compressed as it is copied, using a backup utility. When a data loss or data corruption occurs, the damaged or lost file or files are typically restored from the backup. "Restoring" in this sense, means copying from the removable medium back to the computer or copying and decompressing the data, if a data utility were used. When the files are small, and when a backup is available, restoring files from a backup is a convenient and efficient means to regain information.

As the size, importance and/or the degree to which the files change over time increase, simple copies of files taken periodically are no longer so appealing. For example, suppose a business depends on the reliable availability of a set of very large files that change frequently, as would occur in database files maintained by an airline, for instance. Periodic snapshots of the data (a set of files and directories taken at a particular point in time) may no longer be sufficient. Mirroring may be a better choice. A mirror in computing is a direct copy of a data set such that there are exact duplicate copies of the data on separate machines. The copies are created and then are continually updated so that the copies stay synchronized with the principal database. The mirror can be maintained as a physical copy at the hardware level or through database mechanisms (sometimes called "replication"). A mirror is differentiated from a snapshot in that a snapshot represents the state of the file or database at a particular point in time. A mirror, in contrast, is an active, dynamic copy which is kept up to date with a dynamically changing source.

When a small portion of a database becomes corrupt, the option of restoring the entire database from backups is not optimal because most of the work performed is unnecessary (most of the database is fine). The restoration process is slow, requires the handling of external media (backup tapes or backup disks) and requires human intervention (a database administrator to select which backups to use, etc., a computer operator to find and load the tapes, maybe others). Furthermore, while the restore process is occurring, the database is typically not available to users. Another way to handle the corruption of a page is to try to repair the page. Repairing a page is fast but almost always results in partial or complete loss of the page data, causing logical inconsistencies within the database.

It would be helpful if there were a way to regain the data stored on a corrupted page (a page is a fixed number of bytes of data recognized as a unit by the DBMS, usually 8K bytes) that would be fast and would result in no lost data or data inconsistencies. It may be useful to have this process initiate automatically upon detection of the data corruption and occur without human intervention, without requiring the management and handling of tapes or other removable media.

SUMMARY

A set of servers takes advantage of the existing data redundancy of a mirrored database to restore page corruptions. The page restore may occur with none of the time and/or administration costs of a restore from backup media and without the data loss associated with repair. Furthermore, online page restore from a database mirror can be initiated and performed by the computer system automatically upon corruption detection. The concept can be extended to allow the restore of an entire file or database instead of an individual page or set(s) of pages. The mechanism can be used both to restore corrupt pages on the principal server from a mirror, or corrupt pages on a mirror from the principal server. Online page restore from a database mirror enables nearly instantaneous fixing of page corruptions without data loss. It also allows page data recovery without the need to find/load/scan through and apply data and log backups, allowing efficient and potentially automatic data recovery.

Hence a restore can be performed without requiring backups to be provided or even to be existent. One or more pages may be requested from one or more mirrors, and verification may be performed to ensure that the returned pages are caught up in time to those of the principal server at the time of corruption detection (a "redo" operation on the mirror may not be caught up to the principal's "do" operation when the page request is received by the mirror). Page corruptions may be automatically fixed during a crash recovery scenario or during normal operation when a corruption is detected. During crash recovery, corrupted pages deterring transaction rollback may be automatically restored with no human intervention, enabling rollback of deferred transactions to proceed without human intervention. When multiple mirrors are available, the mirror selected to return the requested page may be selected based on which mirror has the fastest response time historically or based on which mirror is furthest along in replaying the log from the principal server (i.e., which mirror is most up-to-date). A multi-page restore across multiple mirrors may be load-balanced. One or more page restores may be performed automatically upon corruption detection or may be user-driven. Pages may be served for read only queries from the mirror until the corruption on the principal server is fixed. Pages may be served for read/write queries from the mirror until the corruption on the principal server is fixed. Alternatively, the mirror may become the principal server. A corruption on the principal server may be restored from a mirror and conversely, a corruption on the mirror may be restored from the principal server.

DETAILED DESCRIPTION

Overview

Figure 2:
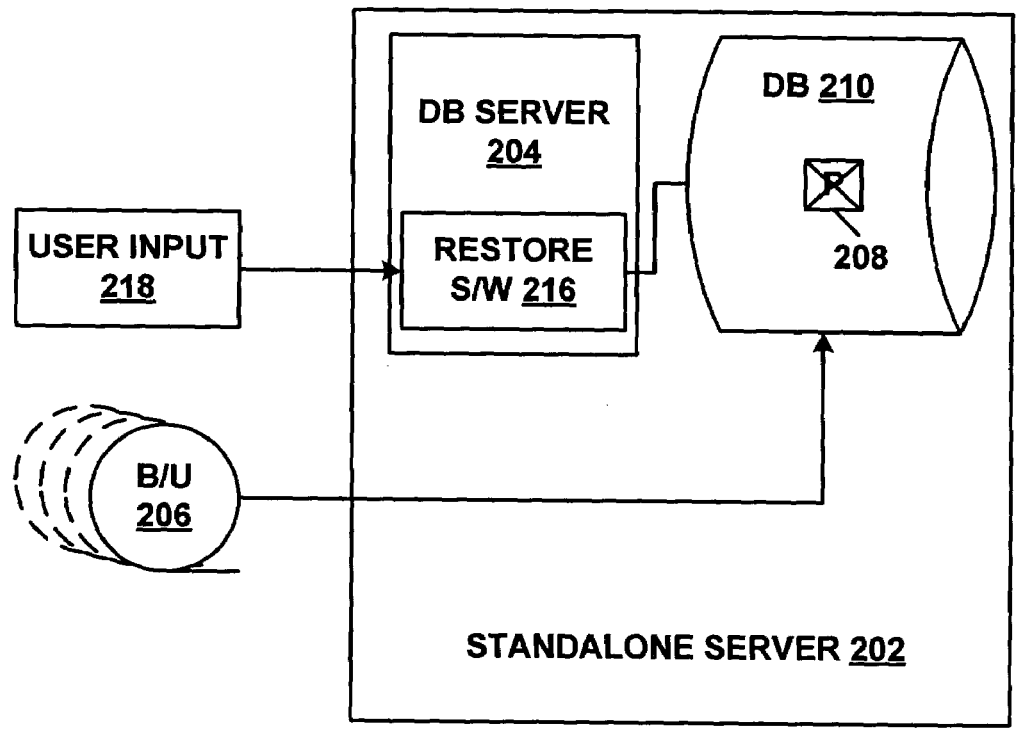
FIG. 2 is a block diagram showing a system for restoring a page in a database as is known in the art.
Figure 4:
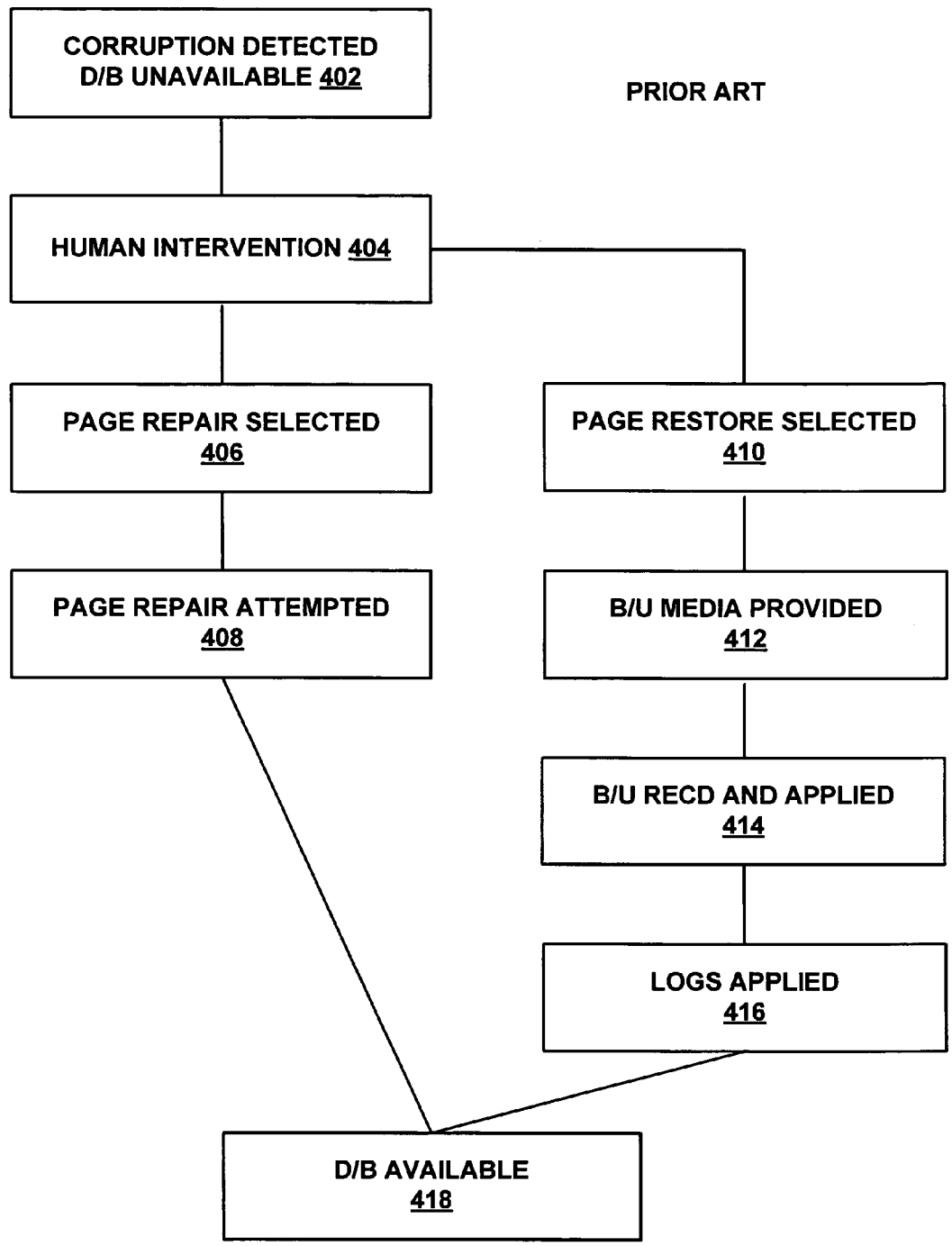
FIG. 4 is a flow diagram showing a method of restoring a page in a database as is known in the art.

FIG. 2 is a block diagram of a system 200 for restoring a page in a database as is known in the art. A database server 204 such as Microsoft's SQL Server, IBM's DB2, Oracle etc. on a computer such as standalone server 202 may include repair/restore software 216 that enables database 210, a portion of which has become corrupt (i.e., corrupt page 208), to be restored from one or more backup media, represented in FIG. 2 by backup tape 206, etc. requiring user intervention, as represented by user input 218 (from a computer operator and/or database administrator, for instance). FIG. 4 is a flow diagram of a method for restoring a page in a database as is known in the art. At 402, a data page corruption is detected. At this point, typically the database becomes unavailable. At 404, a database administrator or other human must decide how to proceed. Suppose, for example, the DBA initiates a page repair at 406. At 408 repair software on the server typically attempts to fix the page contents. Typically data and business logic is lost and inconsistencies within the database result. At 418, once the repair is complete, the database becomes available again. Alternatively, at 410, the DBA decides to restore the database page from backups. At 412, the backup media must be found, loaded, and scanned for the needed page, or if the entire database is reloaded from the backup media, all the backup media must be loaded in sequence for application to the database. At 414 the page is found and is applied to the database, or the entire set of backups are applied to the database. At 416 the page is brought up-to-date by applying one or more logs and at 418 once the restore is complete, the database becomes available again. It will be appreciated that the repair option (steps 404-408, and 418) is likely to result in lost data and database inconsistencies. The restore option (steps 404, 410-418) is likely to be a lengthy process and to require the intervention of at least one human. In both options, the database is typically unavailable during the process of repair or restore.

In accordance with embodiments of the invention, a disaster recovery solution that is entirely software based is described more fully below. Briefly, a simple scenario would be:

1. a corrupt page is detected
2. the database administrator executes a restore function (e.g., "RESTORE DATABASE foo PAGE x FROM MIRROR") or the restore function is initiated automatically (without human intervention) by the computer
3. the server locks the corrupt page in the database
4. a request is sent from the principal server to at least one mirror asking for the database page. The request includes the page identifier(s) of the corrupted page or pages and a log sequence number (LSN) for the current point in time on the principal. The LSN for the current point in time is provided because the LSN on the corrupted page cannot be trusted.

LSNs are important because SQL Server writes changes made to the database to a transaction log, so that if a transaction starts but fails to complete, the changes from the log can be retrieved and re-applied ("rolled back") or can be undone. When a transaction commits, SQL Server writes all the log records pertaining to that transaction to permanent storage on disk. Thus, even if the system fails before SQL Server writes the changed data pages to disk, the log records are on disk. When SQL Server starts again, the log provides enough information to recover, or roll forward, any transactions that completed but whose corresponding data pages were not written to disk. Each record written to the transaction log is assigned a (generally increasing) sequential log sequence number, providing an easy way to track the order in which transactions were applied.

5. the mirror waits for its "redo" operations to pass the LSN provided in the request to ensure that all changes to the requested page have been replayed from the log and applied to the page.
6. the mirror fetches the page from either its buffer pool or its disk. The page now held by the mirror would be guaranteed to be consistent with the database on the principal server, because no updates could have been made in the interim to the page (because it was locked at step 3) and the log has been replayed past the point of locking (at 5).
7. using the database mirroring communication infrastructure, a new message type is used to send the page from the mirror to the principal.
8. upon receiving the page, the principal writes the page to disk to persist the restore and releases the lock, making the fixed page available for queries again.

Error handling processing associated with what happens when mirrors are unavailable, what happens when mirroring is suspended, what happens if a database mirroring failover is triggered during a restore operation, etc. may be provided.

In automatic mode, the process is initiated automatically by the computer without human intervention upon detection of a corrupt page either during crash recovery or during regular operation. When a corrupt page is detected, locks are held automatically for the transaction doing the update to that page. A deferred transaction is a transaction that cannot be resolved (aborted or committed) until some external event occurs. Within the present context, the indicated event is recovery of a consistent page, which can be automatically generated. (Traditionally, the resulting 'deferred transactions' require administrator intervention to resolve the underlying issue.) When the automatic mode feature of the online page restore from a database mirror mechanism is invoked, the corrupt pages (identified by page ids) are locked, the page restores are completed from the mirror, and then code for rolling back the deferred transactions can be invoked, resulting in seamless repair of database page corruptions.

The described technique can be extended to restore an entire file (for instance in the case of a disk crash) from the mirror. Alternatively, the database may fail over to the mirror, the mirror becoming the active (principal) database and the failed copy becoming a mirror. The mirror, in this case, may become the target of the automatic repair, by shipping data from the new principal. If manual mode (human intervention required) is invoked, a file location is optionally specified for cases where the original location is not usable. For automatic mode, a default location may be attempted, otherwise the server may wait for a manual operation to be executed.

If automatic mode is turned off or is not implemented, the underlying page restore mechanism may be used to serve pages from the mirror for read-only queries until corrupt pages are fixed. In this option, the method described above is followed but the page(s) received from the mirror is not written back to disk on the principal. This enables greater data availability while still allowing the administrator to maintain manual control of the restore.

Optimizations include:

1) With multiple mirrors, the principal keeps track of which mirror responds fastest (faster response time may be due to a number of factors, including network differences, physical location, and so on) and request the restore pages from the fastest-responding mirror.

2) If multiple mirrors are at different stages of being caught up with the redo from the log received from the principal, the principal may ask the most up-to-date (current) mirror for the restore pages.

3) When a number of pages are being restored, the mirror may load balance by asking for blocks of pages from the different mirrors.

Exemplary Computing Environment

Figure 1:
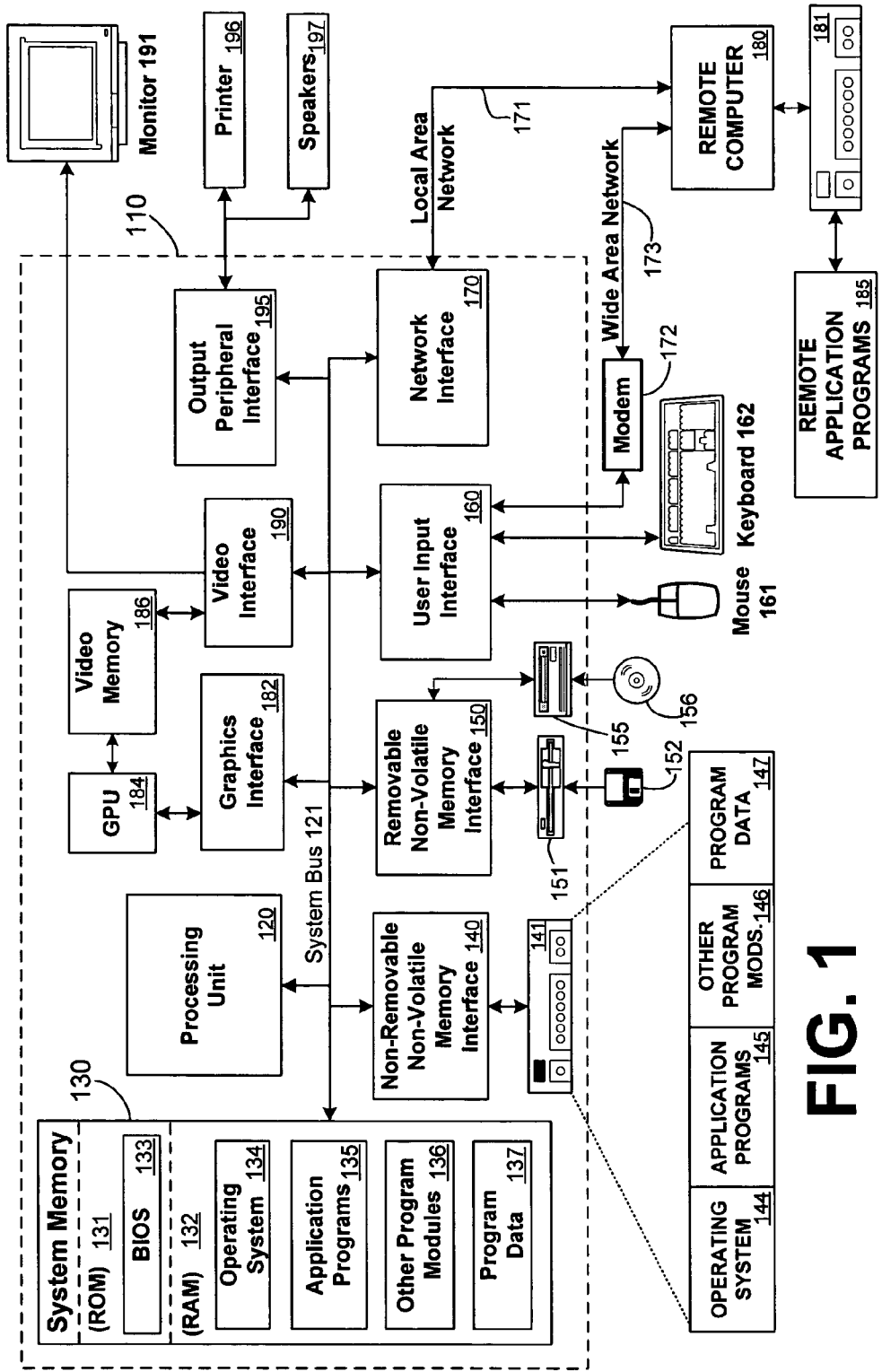
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Online Page Restore from a Database Mirror

Figure 3:
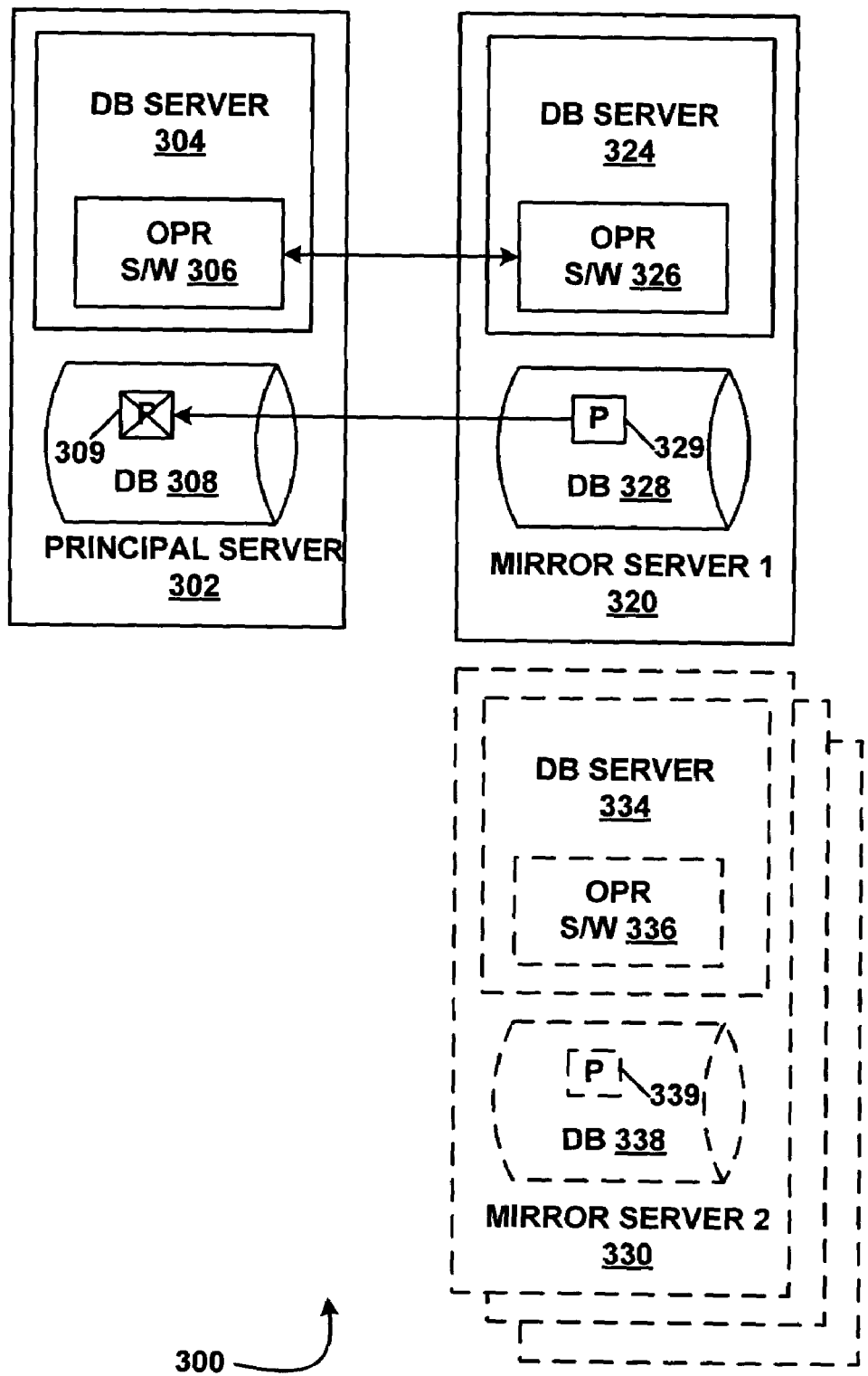
FIG. 3 is a block diagram showing a system for online page restore from a database mirror in accordance with some embodiments of the invention.
Figure 5:
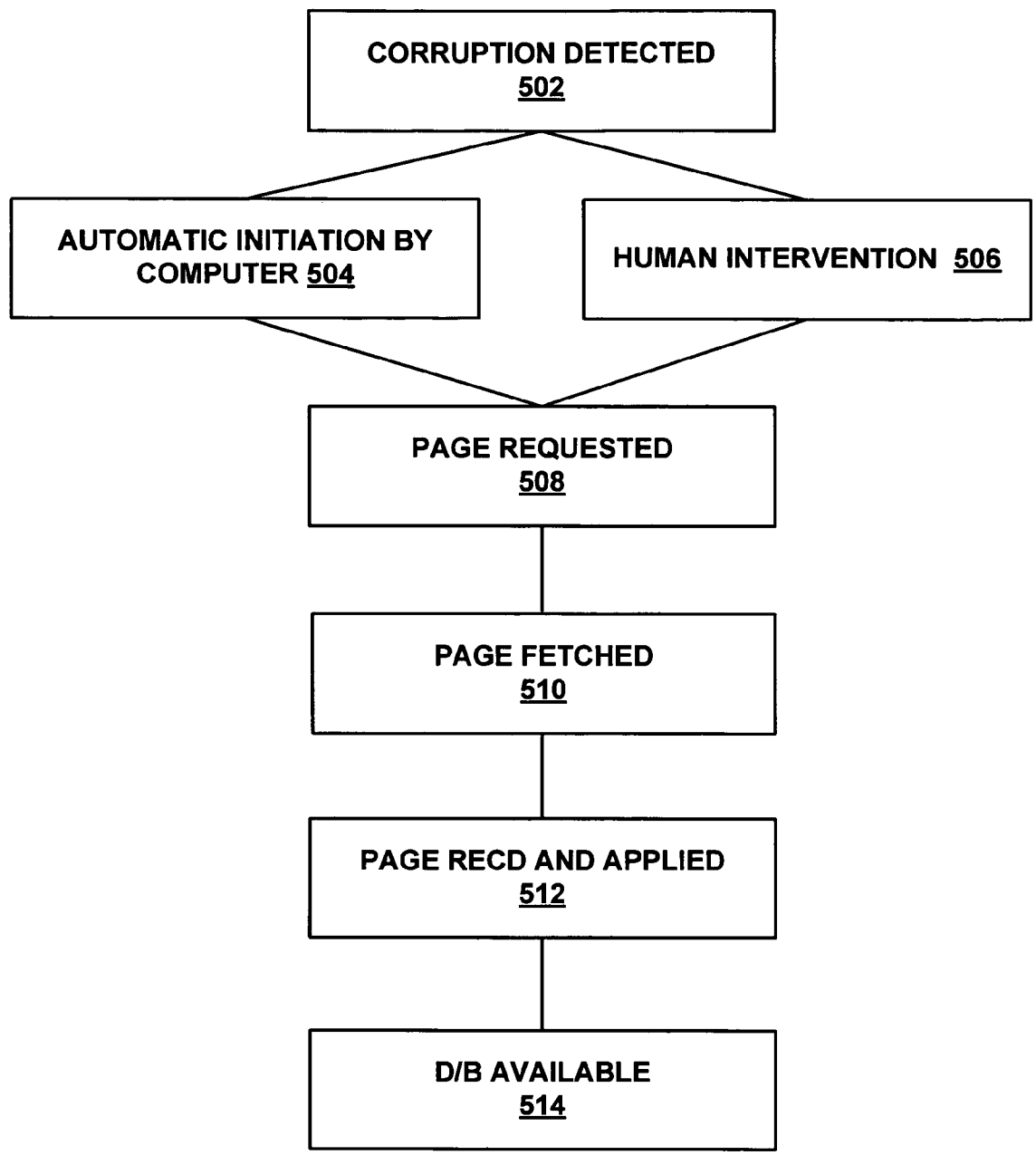
FIG. 5 is a flow diagram showing a method for online page restore from a database mirror in accordance with some embodiments of the invention.

FIGS. 3 and 5 describe exemplary embodiments of the invention. System 300 may reside on one or more computers such as that described above with respect to FIG. 1. System 300 may include one or more of the following components: a principal database (in FIG. 3, database 308 residing on principal server 302), and one or more mirror databases (represented by database 328, 338 etc. residing on one or more mirror servers 320, 330 etc.). Thus, the principal server 302 may include one or more of: an instance of a principal database server 304, such as Microsoft's SQL Server, IBM's DB2, Oracle, etc., a principal database (represented in FIG. 3 by database 308). The principal database server 304 may include a software module 306 that performs the functions of the online page restore from a database mechanism as described herein. Similarly, the one or more mirror database servers 320, 330, etc. may include one or more of: an instance of a mirror database server 324, 334, etc. such as Microsoft's SQL Server, IBM's DB2, Oracle, etc., a mirror database (represented in FIG. 3 by database 328, 338, etc.). The mirror database server(s) 324, 334, etc. may include a software module 326, 336, etc. that performs the functions of the online page restore from a database mechanism as described herein.

In some embodiments of the invention, online page restore from a database modules 306, 326, 336, etc. comprise a disaster recovery solution that is entirely software based, as described more fully below. In some embodiments of the invention, the online page restore module detects a corrupt page or pages on the principal server. In manual mode, the module 306 may receive an instruction executing a restore function. An exemplary, non-limiting instruction may be, for example, "RESTORE DATABASE foo PAGE x FROM MIRROR". Alternatively, in automatic mode, upon detection of the corrupt page, the restore software 306 may be invoked automatically by the computer without human intervention. The principal server 302 may then lock the corrupt page or pages (represented by page 309 in FIG. 3) in the database on the principal server and send a request to at least one mirror asking for the page on the mirror corresponding to the corrupted page (page 329 if the mirror selected is mirror 1 320, page 339 if the mirror selected is mirror 2 330, and so on). The page in some embodiments is identified by a page identifier. A log sequence number (LSN) for the current point in time on the principal server may be sent because the LSN on the corrupted page cannot be trusted. The mirror (320, 330, etc.)

waits for its redo to pass the LSN provided in the request to ensure that all changes to the requested page have been replayed from the log and applied to the page on the mirror (page 329, 339 etc.) so that an up-to-date (current) page is sent to the principal server 302. The mirror fetches the page (page 329, 339 etc.) from either its buffer pool or its disk. The page now held by the mirror would be guaranteed to be consistent with the database on the principal server, because no updates could have been made to the page because it was locked and the log has been replayed past the point of locking. Using the database mirroring communication infrastructure, a special message type is used to send the page from the mirror to the principal, to identify the page as one to be used to restore a corrupt page. Upon receiving the page, the principal server may write the restored page to disk to persist the restore. The lock may be released, making the fixed page available for queries again.

Error handling processing is performed if a mirror or mirrors are unavailable, mirroring is suspended, or if a database mirroring failover is triggered during a restore operation, etc.

In automatic mode, the process is initiated automatically by the computer without human intervention upon detection of a corrupt page either during crash recovery or during regular operation. When a corrupt page is detected, locks are held automatically for the transaction doing the update to that page. (Traditionally, the resulting 'deferred transactions' require administrator intervention to resolve the underlying issue.) When the automatic mode feature of the online page restore from a database mirror mechanism is invoked, the corrupt pages (identified by page ids) are locked, the page restores are completed from the mirror, and then code for rolling back the deferred transactions can be invoked, resulting in seamless repair of database page corruptions.

The described method can be extended to restore an entire file (for instance in the case of a disk crash) from the mirror. If manual mode (human intervention required) is invoked, a file location is optionally specified for cases where the original location is not usable. For automatic mode, a default location may be attempted, otherwise the server may wait for a manual operation to be executed.

If automatic mode is turned off or is not implemented, the underlying page restore mechanism may be used to serve pages from the mirror for read-only queries until corrupt pages are fixed. In this option, the method described above is followed but the page received from the mirror is not written back to disk on the principal. This enables greater data availability while still allowing the administrator to maintain manual control of the restore.

Optimizations include:

1) With multiple mirrors, the principal keeps track of which mirror responds fastest (faster response time may be due to a number of factors, including network differences, physical location, and so on) and request the restore pages from the fastest-responding mirror.

2) If multiple mirrors are at different stages of being caught up with the redo from the log received from the principal, the principal may ask the most up-to-date mirror for the restore pages.

3) When a number of pages are being restored, the mirror may load balance by asking for blocks of pages from the different mirrors.

FIG. 5 is a flow diagram illustrating an exemplary method for an online page restore from a database in accordance with some embodiments of the invention, and as described above with respect to FIG. 3. At 502 a corruption is detected. The corruption may be detected during crash recovery or during normal operation. The corruption may be limited to a single page, or set of pages, or may involve an entire file or database. If the online page restore is operating in manual mode, human intervention is required (506). Someone, such as for example, a database administrator, may execute a command which specifies a specified page to be restored, a set of pages to be restored, a file (such as a file system file or database file) the entirety of which is to be restored. Additionally, the database to which the page or pages belong and one or more mirrors from which to receive the corresponding undamaged page or pages may be specified. The page to be restored or the set of pages to be restored may be identified by page id or range of page ids. A LSN associated with the time at which the corruption is detected may also be specified. It will be appreciated that the LSN associated with the corrupted page is unreliable because the LSN may be corrupted.

If the online page restore is operating in automatic mode, at 504, upon detection of the corruption, the restore is initiated by software running on the computer and without requiring human intervention. In automatic mode, the parameters described in the preceding paragraph are set by the online page restore software running on the computer. At 508, whether in manual or in automatic mode, the corrupted page or pages in the principal database is/are locked. At the point of locking, the corrupted page or pages become unavailable but the rest of the database is still accessible (e.g., available for user queries and updates, etc). The corrupted page or set of pages is requested from at least one mirror. The mirror or mirrors that receive the page request may be selected based on the mirror which has historically had the fastest response time, based on the most up-to-date (current) mirror or based on other suitable criteria. If a large number of pages or the entire file have to be restored, load balancing may be performed by sending an (optionally non-overlapping) request for a subset of the required pages to a number of mirrors. Suppose, for ease of understanding that a single page is corrupted and an appropriate mirror, say, mirror 1 has been selected to receive the page request. It will be appreciated that the invention as contemplated is not so limited however. At 508 the principal server may send a request for page id X to mirror 1 and a LSN as described above. At 510, the mirror may receive the request, and may wait until its log updates have been applied to the LSN received to ensure that the page is up-to-date (all changes to the page made before corruption detection) have been applied. Once the log has been applied to at least the point indicated by the received LSN, the mirror page or pages corresponding to the corrupted page may be fetched either from a buffer pool on the mirror or from a mirror disk. A message of a specified type identifying the message as an online page restore message may be generated and sent to the principal server. At 512, the page may be received at the principal server and applied to the database. The page may be written to disk to persist the restored page. The lock may be released (514), making the restored page available for queries and updates as determined by the characteristics of the database.

In some embodiments of the invention, while the corrupt page(s) are being restored, queries directed to the corrupt page or pages may be served from the mirror, allowing for greater availability of the data.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for restoring information comprising:
   a processor;
   a module executed by the processor, the module adapted to restoring corrupted information stored in a first database from corresponding uncorrupted information stored in a second database in response to a query for information stored in the first database, the first database and the second database comprising mirrors of one another, the query directed at corrupted information, the module adapted to perform the following:
   locking a portion of the database containing the corrupted information in the first database, wherein all information stored in the first database except for the corrupted information remains accessible;
   sending a request to the second database for the uncorrupted information corresponding to the corrupted information in the first database, the request comprising an identifier of the corrupted information and a log sequence number associated with a time at which the corrupted information in the first database is detected;
   waiting until a transaction log associated with the second database has been applied in the second database to at least the point indicated by the received log sequence number;
   receiving uncorrupted information from the second database corresponding to the corrupted information;
   replacing the locked corrupted information in the first database with the uncorrupted information from the second database; and
   unlocking the locked portion of the database.

2. The system of claim 1, wherein the first database is a mirror database and the second database is a principal database.

3. The system of claim 1, wherein the first database is a principal database and the second database is a mirror database.

4. The system of claim 3, wherein the mirror database is a first mirror database of a plurality of mirror databases.

5. The system of claim 4, wherein the first mirror database is selected based on currency.

6. The system of claim 1, wherein the module comprises logic adapted to automatically restore the corrupted information from the second database upon detection of the corrupted information.

7. The system of claim 1, wherein the second database serves queries directed to the corrupted information in the first database.

8. The system of claim 1, wherein the corrupted information comprises a page of the first database, a set of pages of the first database or the first database.

9. A computer-implemented method for restoring corrupted information stored in a first database comprising:
   in response to a query for information stored in the first database, the query directed at corrupted information, locking a portion of the database containing the corrupted information in the first database and initiating restoration of the corrupted information without human intervention, the first database remaining accessible except for a portion of the first database on which is stored the corrupted information;
   sending a request for a page or a set of pages to a second database, the first database and the second database comprising mirrors of one another, the page or the set of pages comprising uncorrupted information in the second database corresponding to the corrupted information in the first database, the request comprising an identifier of the corrupted information and a log sequence number associated with a time at which the corrupted information in the first database is detected;
   waiting until a transaction log associated with the second database has been applied in the second database at least the point indicated by the received log sequence number;
   receiving the corresponding uncorrupted information from the second database and applying the corresponding uncorrupted information to the first database; and
   unlocking the locked portion of the database,
   wherein the second database is a first mirror database of a plurality of mirror databases,
   wherein load balancing is performed by sending to the first mirror database a first request for a first range of pages to be restored to the first database and by sending to a second mirror database of the plurality of mirror databases a second request for a second range of pages to be restored to the first database; and
   wherein the first database keeps track of which of the plurality of mirror databases responds fastest and routes requests to mirror database that has responded fastest in the past.

10. The method of claim 9, further comprising:
    sending a page identifier or a range of page identifiers and a log sequence number associated with a point in time at which the corrupted information was detected to the second database.

11. The method of claim 9, further comprising serving requests directed to the corrupted information in the first database from the second database.

12. The method of claim 9, further comprising selecting the second database based on currency or on response time.

13. The method of claim 9, further comprising persisting the uncorrupted information in the first database.

14. A computer-readable storage medium storing computer-executable instructions which when executed by a computing processor enable a method comprising:
    locking a portion of a database containing corrupted information in a first database, the first database comprising a principal database;

receiving user input comprising at least one of: a page identifier of a page of the principal database to restore, the page comprising a portion of the first database on which the corrupted information is stored, a mirror database to which a request for a corresponding page of the mirror database identified by the page identifier of the user input;

receiving a log sequence number associated with a time at which the corrupted information in the first database was detected;

identifying the mirror database and initiating restoration of the corrupted information without human intervention, the first database remaining accessible except for the page of the first database on which is stored the corrupted information;

sending a request for a page or a set of pages to a second database, the first database and the second database comprising mirrors of one another, the page or set of pages comprising uncorrupted information in the second database corresponding to the corrupted information of the first database, the request comprising the log sequence number associated with the time at which the corrupted information in the first database was detected;

waiting until a transaction log associated with the second database has been applied in the second database to at least the point indicated by the received log sequence number;

receiving the corresponding uncorrupted information from the second database;

applying the uncorrupted information to the first database; and unlocking the locked portion of the database.

15. The readable storage medium of claim 14 comprising further computer-executable instructions for:
persisting the uncorrupted information in the first database.

16. The readable storage medium of claim 14, comprising further computer-executable instructions for:
selecting the second database based on currency of the second database, the second database comprising a first mirror database of a plurality of mirror databases associated with the first database.

17. The readable storage medium of claim 14, comprising further computer-executable instructions for:
selecting the second database based on response time of the second database, the second database comprising a first mirror database of a plurality of mirror databases associated with the first database.

18. The readable storage medium of claim 14, comprising further computer-executable instructions for:
load balancing the restoring of the corrupted information by sending a first range of page numbers to a first mirror and a second range of page numbers to a second mirror.

* * * * *

UNITED STATES PATENT AND TRADEMARK OFFICE
CERTIFICATE OF CORRECTION

| | | |
|---|---|---|
| PATENT NO. | : 7,636,741 B2 | Page 1 of 1 |
| APPLICATION NO. | : 11/204593 | |
| DATED | : December 22, 2009 | |
| INVENTOR(S) | : Jakub Kulesza et al. | |

It is certified that error appears in the above-identified patent and that said Letters Patent is hereby corrected as shown below:

In column 14, line 6, in Claim 15, delete "readable" and insert -- computer-readable --, therefor.

In column 14, line 9, in Claim 16, delete "readable" and insert -- computer-readable --, therefor.

In column 14, line 15, in Claim 17, delete "readable" and insert -- computer-readable --, therefor.

In column 14, line 21, in Claim 18, delete "readable" and insert -- computer-readable --, therefor.

Signed and Sealed this
Eighteenth Day of January, 2011

David J. Kappos
*Director of the United States Patent and Trademark Office*